July 23, 1940.  H. NEUWIRTH  2,208,642
HAND READING GLASS AND THE LIKE
Filed June 23, 1938
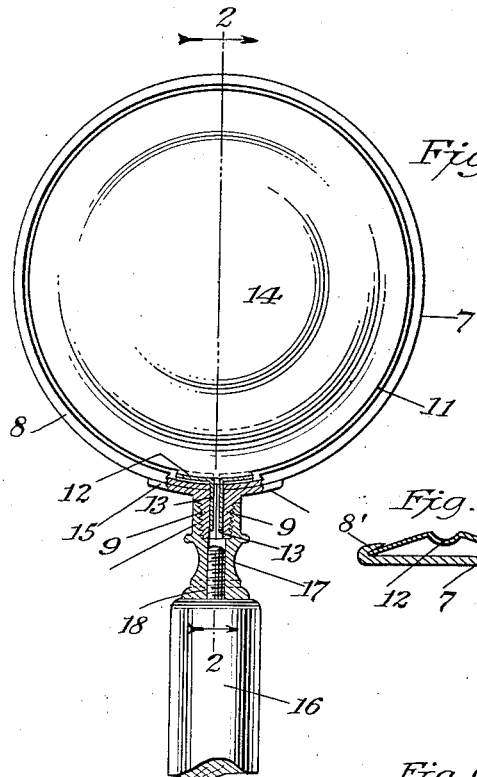
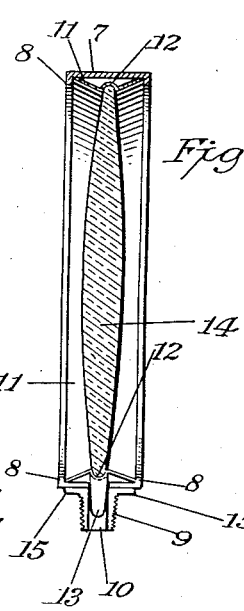
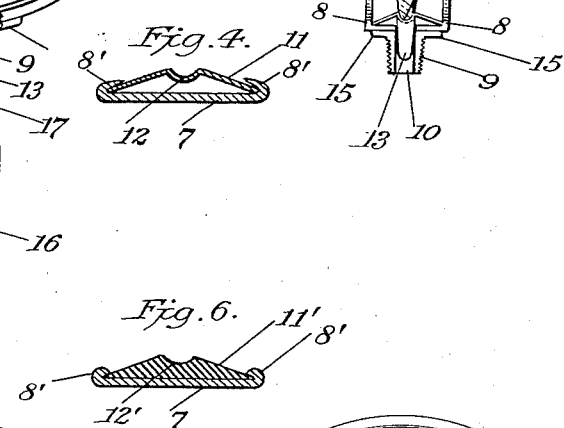
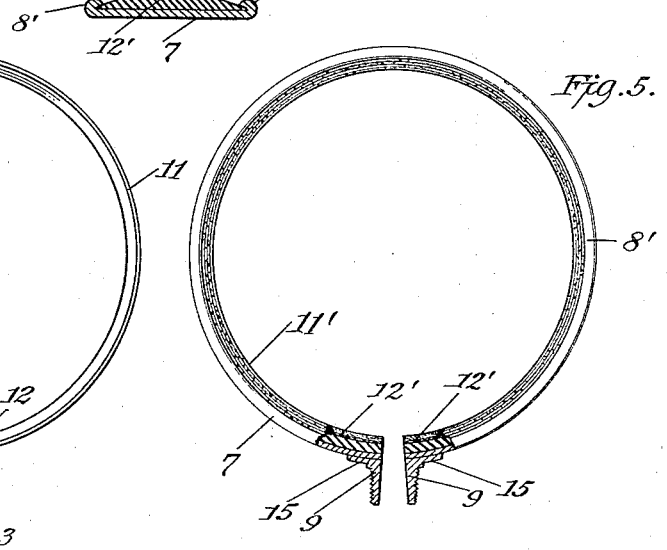
INVENTOR,
H. Neuwirth,
BY John A. Seipert
ATTORNEY Patented July 23, 1940

2,208,642

UNITED STATES PATENT OFFICE 2,208,642

HAND READING GLASS AND THE LIKE

Herman Neuwirth, Brooklyn, N. Y., assignor to Testrite Instrument Company, Inc., New York, N. Y., a corporation of New York Application June 23, 1938, Serial No. 215,422

1 Claim. (Cl. 88—39)

This invention relates to frames adapted to support therein a body at the peripheral edge, such as a lens or mirror, and the frame mounted on a hand grip to support the same, and while the invention is particularly adapted to peripherally support a lens and constitutes what is commonly termed a reading glass, it is also applicable for other purposes, such as a hand mirror.

In reading glasses to support the lens at the peripheral portion there is provided a supporting frame substantially of rigid material adapted to be extended about the entire periphery of the lens, the frame being split or transversely severed whereby it may be expanded to engage the lens within the same, the frame usually being provided with a groove or recess extended about the inner surface for engagement of the periphery of the lens, when the frame is contracted to clamp the lens within the frame. The means for contracting the frame consists of an externally threaded stud, usually tapered, and separated into two longitudinal sections, one section being fixed to each split end of the frame. The frame is contracted by bringing the sections of the stud together into mating relation and is effected by threading the stud sections into a correspondingly internally threaded bore in a connecting or coupling member attached to the end of a hand grip. The frame is of substantially rigid material though somewhat yielding and arranged to support a lens of predetermined and uniform size, and while it is contemplated that the lens shall be of the same uniform size, lenses not only vary in size but are of irregular form with the result that as the frame member is contracted to clamp the lens therein the frame, due to its rigidity, will not give and the lens or mirror to be mounted in the frame is broken.

It is the object of the present invention to provide a mounting frame for a lens or mirror to overcome the above disadvantages of breaking the lens or mirror as it is clamped within the frame, and to provide resilient and yielding mounting means for a lens or mirror in a frame adapted to compensate for over and under sized lenses as well as for irregularities in the peripheral edge of the lens or mirror.

In the drawing accompanying and forming a part of this application Figure 1 is a front elevation of a reading glass, partly in section, to show the arrangement of my improved means for resiliently and yieldingly mounting a lens or mirror in the carrying frame therefor.

Figure 2 is a sectional view taken on the line 2—2 of Figure 1 looking in the direction of the arrow.

Figure 3 is a side elevation, partly in section, of means for resiliently and yieldingly mounting a lens or mirror in the carrying frame.

Figure 4 is a cross sectional view of the carrying frame showing a modified construction thereof and the resilient and yielding lens mounting member therein.

Figure 5 is a front elevation of a mounting frame showing the same in expanded condition and a modified resilient and yielding member to mount a lens or mirror in the frame; and Figure 6 is a cross sectional view of the frame and mounting member shown in Figure 5.

While the invention is shown in the drawing as arranged to mount a lens of circular form in a frame, it is equally applicable for the mounting of a lens in a frame of rectangular, oblong or elliptical frame.

In carrying out the invention as shown in the drawing there is provided a frame consisting of a flat band 7 of relatively rigid though somewhat resilient material the opposite longitudinal edge portions of the band are flanged laterally in the same direction to extend at a right angle to the body of the band, as shown at 8 in Figure 2. The longitudinal marginal flanges may be arranged to extend at an acute angle to the body of the band, as shown at 8' in Figures 4 and 6. The band 7 is shaped to conform to the periphery of the lens to be supported thereby, in the present instance to circular split form, with the flanges extending inwardly and arranging the frame of channel shape in cross section with the channel on the inner side. To bring the split ends of the band together it is contracted and to contract the circular frame it is provided with a tapered external threaded stud constructed integral with or fixed to a plate intermediate the ends thereof. The stud and plate are arranged in two sections by splitting the plate transversely and the stud longitudinally thus providing the two stud sections 9, one section being connected to one end of the frame and the other section to the other end of the frame with the severed edges in opposed relation, as shown in Figures 1, 2 and 5, the sections being connected to the frame by suitable means, as by welding, riveting or otherwise. In the fully contracted position of the frame member 7 the severed ends and the sections of the stud will be in abutting relation. In the present instance the plate and stud are provided with recesses in the mating faces thereof, which recesses may be formed by a bore extended through the stud and plate, as shown at 10 in Figure 2.

To yieldingly though firmly mount the lens in the frame 7 and compensate for variations in size or irregularities in the periphery of the lens, there is provided a springy and yielding band shaped to split annular form to adapt it to be expanded and contracted to annular form substantially equal to the internal diameter of the frame 7. As shown in Figures 1 to 4, this mounting member comprises a band 11 of resilient sheet metal of obtuse angle form in cross section and the angle portion recessed inwardly to arcuate form in cross section, as shown at 12. The width of the mounting member 11 is preferably equal to the space between the frame flanges 8 although it may be of slightly greater width, and as it is engaged in the frame 7 it may be slightly compressed laterally and when released it will expand under the inherent tension of the material thereof and the side edges impinge against the frame at the juncture of the frame flanges with the body of the frame, as clearly shown in Figure 2. The circumference of the mounting member 11 is equal to the circumference of the frame and to retain the mounting member against rotative displacement in the frame it is provided with laterally extending flange portions 13 at each end midway the sides and provided on the mounting member by making the band from which it is formed of greater length than its final form and severing portions from the ends at opposite sides of the intermediate recessed portion 12 and then bending this extended portion laterally so that it will extend transversely of the ends of the frame when the mounting member is positioned therein. To adapt the ends of the frame member to be brought into abutting relation the ends are provided with a transverse recess intermediate the sides thereof for the engagement of the flanges 13 of the mounting member, as clearly shown in Figure 2. After the mounting member 11 has been arranged in the frame 7 the lens 14 is engaged in the mounting member with the peripheral edge engaging in the arcuate recess 12.

To contract the frame and lens mounting member means are provided to firmly though yieldingly secure the lens in the frame. As shown, this means comprises a longitudinally split and externally threaded conical or tapering stud arranged on a plate, as at 15, one plate and stud section being fixed to each end of the frame on the extremity thereof with the stud sections extending laterally from the frame. These plate and stud sections are constructed in one piece and thence split or severed midway the ends and each section fixed to an end of the frame member, as by riveting, spot welding or otherwise. To permit bringing the ends of the mounting member 11 into abutting relation the opposed faces of the stud sections are provided with a longitudinal recess, which may be formed by a bore arranged in the stud prior to splitting the same, the recess being adapted for the engagement of the flanges 13 of the mounting member. It will be obvious that if desired said flanges 13 may be of a length to only engage the recess in the ends of the frame member, in which case the stud sections need not be provided with the recess in the opposed faces thereof.

To contract the frame and lens mounting member and mount the frame with the lens mounted therein on a hand grip 16 to support the same there is provided a tubular connecting or coupling member 17, the bore at one end being internally screw threaded and arranged complemental to the stud and have threaded connection therewith, as shown in Figure 1. It will be obvious that as the connecting member is mounted on the stud sections they will be drawn together due to the tapered form of the stud and threaded bore in the connecting member, and thereby draw together and contract the frame and lens mounting member, the connecting member being threaded onto the stud sections with the end abutting a shoulder at the base of the stud sections. To mount the lens carrying frame on the hand grip 16 an externally threaded stud fixed in the end of the hand grip has screw threaded connection with the end of the bore in the connecting member, as shown at 18 in Figure 1. The lens engaging recess 12 in the mounting member 11 in the fully contracted condition of said member is of a diameter slightly less than the diameter of the lens and at the same time adapt the same for mounting of undersized lenses, and should the lens be of oversize or have irregularities in the periphery the mounting member will adapt itself to the size and shape of the lens as the mounting member is contracted. In reading glasses of this character wherein the lens is mounted directly in a frame of rigid material should the reading glass be dropped or otherwise jarred the lens is broken. By the provision of the resilient and yielding lens mounting member 11 should the glass be dropped the impact of the frame will be taken up in the lens mounting member, reducing the possibility of the lens being broken.

In Figures 5 and 6 I have shown a modified construction of the lens mounting member. In this construction there is provided a lens mounting member 11' of resilient and yielding material, such as rubber, of triangular form in cross section with the base arranged of a width substantially equal to the width of the spaces between the flanges 8, 8' of the frame member and adapted to engage the inner face of the frame, as shown in Figure 6. The other angle faces are arranged at an acute angle to the base or the horizontal, and it is provided at the angle of said faces with a longitudinal recess 12' of arcuate form in cross section for the engagement of the periphery of the lens. The frame is also provided at the ends with the plate and stud sections 9, 15. This arrangement of mounting member as it is contracted with the frame will function in the manner of the mounting member 7 to mount and yieldingly support the lens in the frame.

Having described my invention I claim:

In mounting means for reading glasses, an expansible and contractile annular flat band of rigid material having flanges at the opposite side edges extending inwardly at an acute angle to the body of the band, complemental mating tapered and externally screw threaded stud sections extending laterally from the ends of said band adapted for connection of means to contract the band and connect a supporting hand grip thereto, and a band of resilient sheet metal of obtuse angle form in cross section engaged at the side marginal portions within the flanges of the rigid band, and said resilient band having a groove of arcuate form in cross section in the angle thereof adapted for mounting a lens at the periphery therein and yieldingly clamping the lens therein in the contracted condition of the rigid band.

HERMAN NEUWIRTH.